J. H. TEN BRINK AND A. V. MARTIN.
MACHINE FOR FORMING BATTERY JARS.
APPLICATION FILED FEB. 28, 1920.

1,363,695.

Patented Dec. 28, 1920.
5 SHEETS—SHEET 2.

Inventors
John H. Ten Brink and
Alvin V. Martin,
By Watson E. Coleman
Attorney

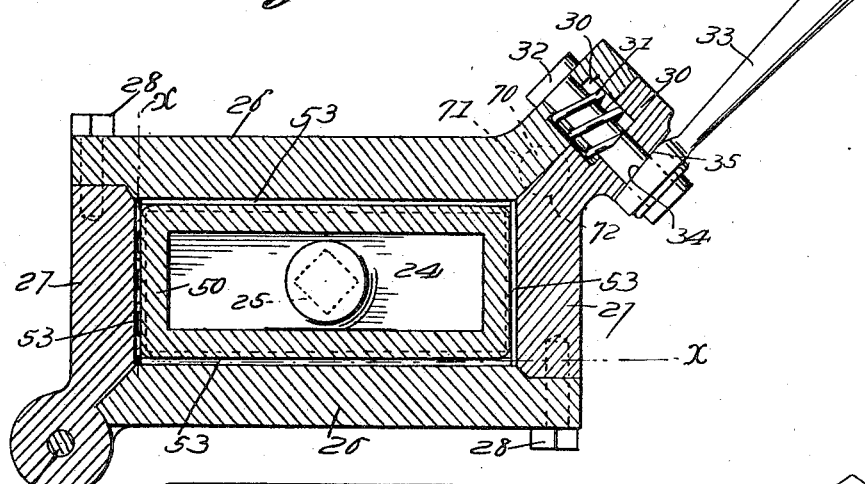
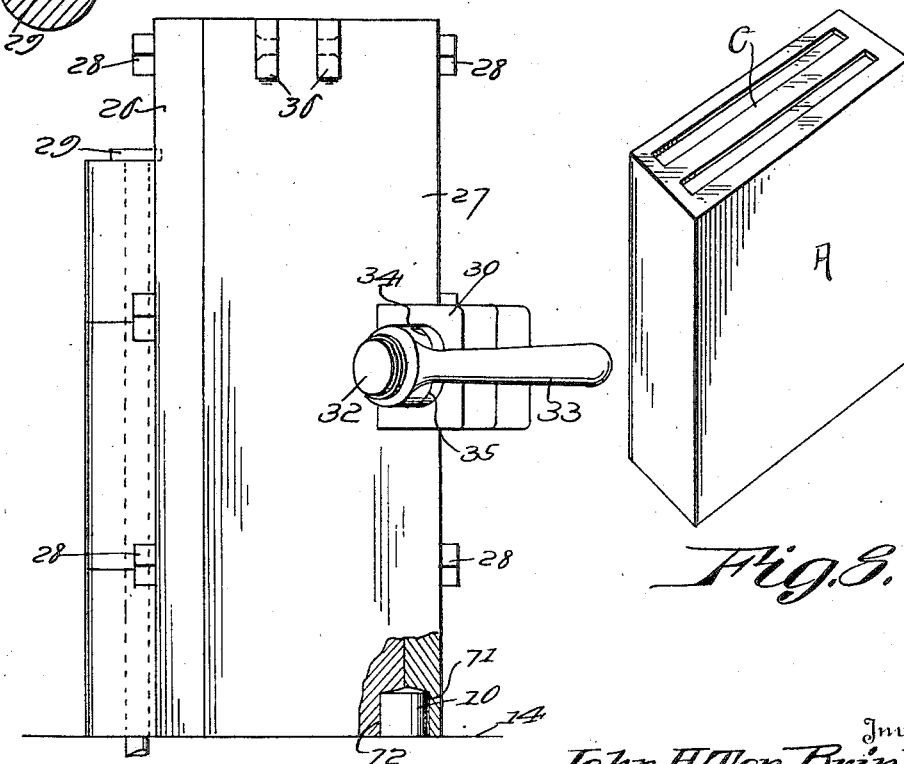

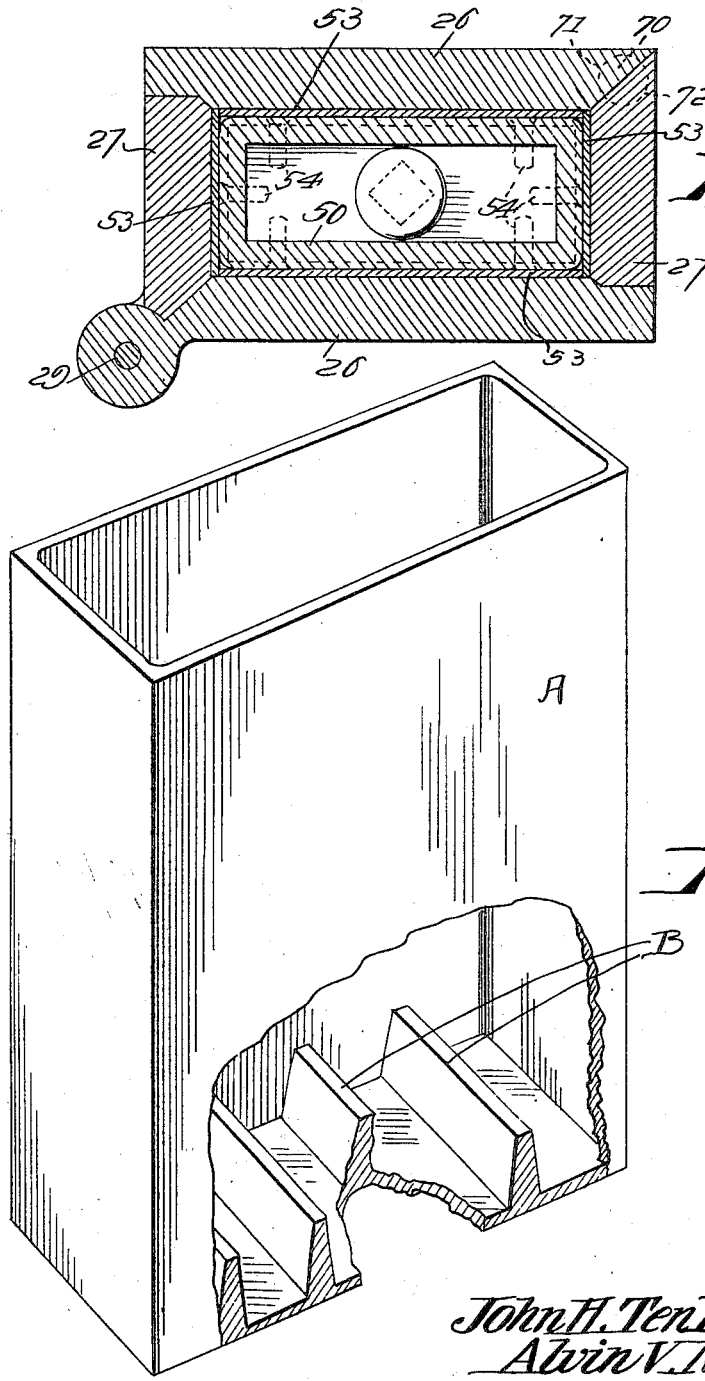

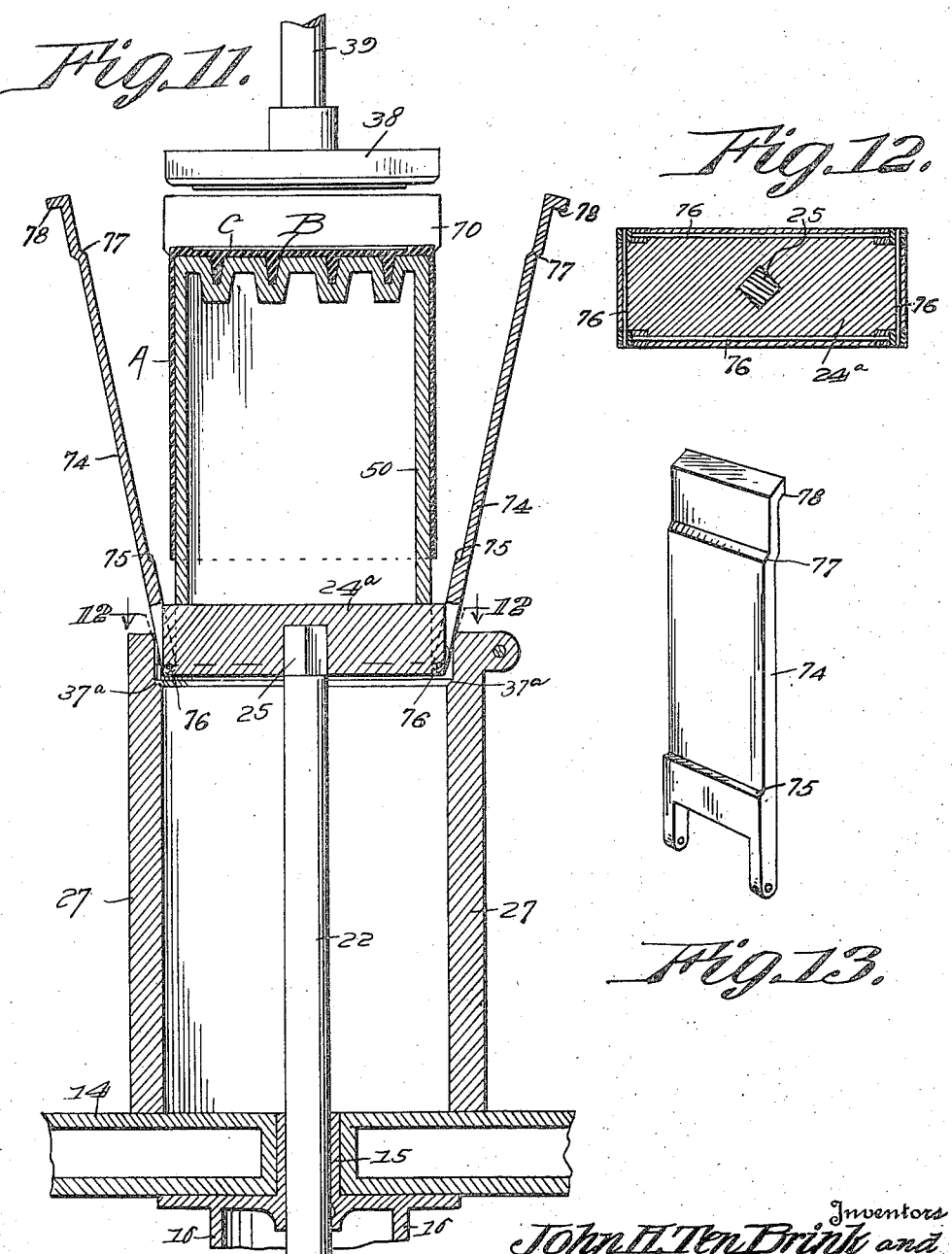

UNITED STATES PATENT OFFICE.

JOHN H. TEN BRINK AND ALVIN V. MARTIN, OF MUSKEGON, MICHIGAN.

MACHINE FOR FORMING BATTERY-JARS.

1,363,695.  Specification of Letters Patent.  Patented Dec. 28, 1920.

Application filed February 28, 1920. Serial No. 362,070.

*To all whom it may concern:*

Be it known that we, JOHN H. TEN BRINK and ALVIN V. MARTIN, citizens of the United States, residing at Muskegon, in the county of Muskegon and State of Michigan, have invented certain new and useful Improvements in Machines for Forming Battery-Jars, of which the following is a specification, reference being had to the accompanying drawings.

This invention relates to molding or pressing machines, and particularly to machines designed for forming battery jars of hard rubber, or forming articles of like character.

As far as known to us, battery jars of hard rubber are today made by hand, which is a more or less expensive method, due to the relatively high cost of the labor employed, and to the fact that there is a very large percentage of waste and defective jars. In the manufacture of these jars today, sheet rubber is used which is cut by hand, folded over upon suitable mandrels or forms, and vulcanized. The sheets of rubber and rubber composition are, therefore, more or less irregular and the resultant product is irregular. A reinforcing strip is placed upon the bottom of each jar, and this is cut by hand and applied by hand. Certain lugs extend across the lower portion of the jar, and these also are cut and inserted by hand at a relatively large expense. Furthermore, in cutting these, the lugs are oftentimes too long or too short, and this causes the lower portion of the battery jar to be forced out in places and depressed in other places.

In the manaufacture of the battery jars, it takes 18 men 10 hours to turn out 2,500 of these battery jars, and 15% of these jars so turned out will be defective and will have to be cast aside as unmarketable. Therefore, to produce 2,500 of these jars according to the present method, about 2,940 jars will have to be manufactured.

The general object of this is to provide a machine whereby the hand work necessary to use in the formation of battery jars will be largely eliminated, and whereby a more perfect battery jar will be turned out than is at present possible, this battery jar being seamless, having practically no irregularities of contour or formation, and having walls of a uniform thickness throughout their entire extent.

A further object is to provide a mechanism of this character comprising a mold, as it may be called, with an interior mandrel, and provide means for heating the mold for shiftably supporting the mandrel therein and for forcing rubber into the space between the mandrel and the mold to form the complete jar.

A further object is to provide means whereby the mandrel may be shifted out of the mold to permit the removal of a mandrel and the removal of the completed jar, and to permit the insertion of a new mandrel when necessary, the mandrel being then carried back into the mold, and provide a closure for the top of the mold in the form of a piston or plunger which will force the softened rubber into the space between the mandrel and the mold to thereby form the lugs and reinforcing strip in one operation.

A further object is to provide compressed air operated means for shifting the plunger and for shifting the mandrel support.

Another object is to provide means attached to the mold whereby the completed jar may be stamped while it is still soft.

Another object is to provide an improved form of mold for this purpose which is formed in sections and in which the sections may be readily shifted away from each other to permit the removal of the mandrel and completed jar from the mold and to permit the insertion of a new mandrel, and provide improved locking mechanism for these mold sections.

A further object is to provide very simple means whereby compressed air may be admitted to the cylinders in which the pistons for the mandrel support and plunger operate and for controlling exhaust from the cylinders.

Other objects have to do with the details of construction and arrangements of parts as will hereinafter more fully appear.

Fig. 4 is a transverse section on the line 4—4 of Fig. 2;

Fig. 5 is a transverse section on the line 5—5 of Fig. 2;

Fig. 6 is an end elevation of the mold showing the lower corner partly broken away;

Fig. 7 is a perspective view partly broken away of the completed jar;

Fig. 8 is a perspective view of the completed jar looking at the bottom to show the reinforce formed therein;

Fig. 11 is a vertical sectional view through a mold and the mandrel showing a modification of the mandrel support;

Fig. 12 is a section on the line 12—12 of Fig. 11;

Fig. 13 is a perspective view of one of the plates 70;

Figure 1:
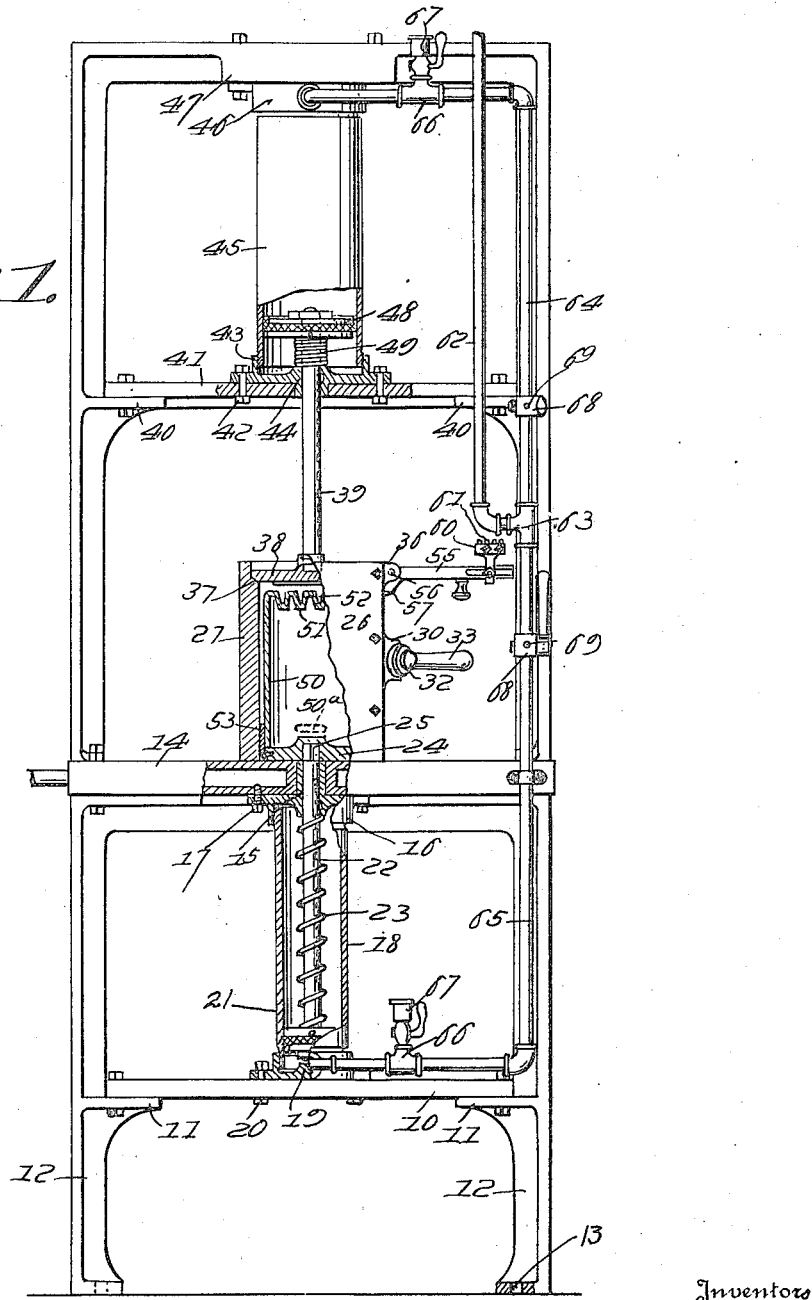
Figure 1 is an elevation partly in section of our jar molding mechanism.

Referring to the drawings, 10 designates a supporting plate which is mounted on the flanges 11 of suitable supporting standards 12 which are adapted to be attached to a table, bench, or other support by screws passing through the apertures 13. These standards may extend up the full height of the machine for the support of the parts above, or the standards may be in sections.

Mounted upon these standards, and above and in spaced relation to the plate 10, is a heating plate 14 which may be of cast iron or any other suitable material, and is hollow and is connected to a source of steam or other heating medium. This plate 14 is annular in form to provide a central aperture through which is disposed the hub 15 of a cylinder head 16, which is held to the heating plate by means of screws 17. Engaged with interior screw-threads formed on the depending flange of the head 16 is a cylinder 18, the lower end of which has screw-threaded engagement with a lower head 19 held to the plate 10 by means of bolts 20. Within this cylinder operates a piston 21, the piston rod 22 of which extends upward through the hub 15 and is preferably keyed thereto. A coiled compression spring 23 surrounds this piston rod and bears at its upper end against the head 16 and at its lower end against the piston. The piston extends through the bushing or hub 15 and carries upon its upper end a mandrel support 24, the upper end of the piston being many-sided, as at 25, and the mandrel support having a many-sided socket fitting over this piston rod. It will thus be seen that when compressed air or other fluid medium is admitted beneath the piston 21, that the mandrel support will be carried upward and that when an outlet is provided for this fluid medium, the mandrel will descend under the action of the spring 23.

Mounted upon the heating plate 14 is a mold composed of four sections arranged in pairs, each pair of sections being connected to each other. The mold consists of the lateral sections 26, which are opposed to each other and which are relatively long, and the end sections 27. Each end section is held to its corresponding lateral section by means of screws 28 or like attaching devices so that the sections 26 and 27 move together. One of the sections 27 and one of the sections 28 have hinged engagement with each other by means of ears and a pintle 29. This hinge is disposed at one corner of the mold, which is rectangular in plan view, as illustrated in Fig. 4. The other members 26 and 27 at the corner diametrically opposite the point of hinged engagement have outwardly projecting lugs 30 which are recessed on their confronting faces to receive within them a coiled spring 31 which surrounds a bolt 32 which extends through the ears 30 and through an aperture in a clamping handle 33. The clamping handle 33 has a cam-shaped inner face 34 which operates against the cam-shaped face 35 carried on the adjacent lug 30 so that when the handle is turned in one position, the lugs 30 will be clamped against each other, and when the handle is turned in the opposite direction, the spring 31 will act to force the lugs apart and thus open the mold sufficiently to permit the removal of the mandrel and of the completed article therefrom.

Figures 2, 3:
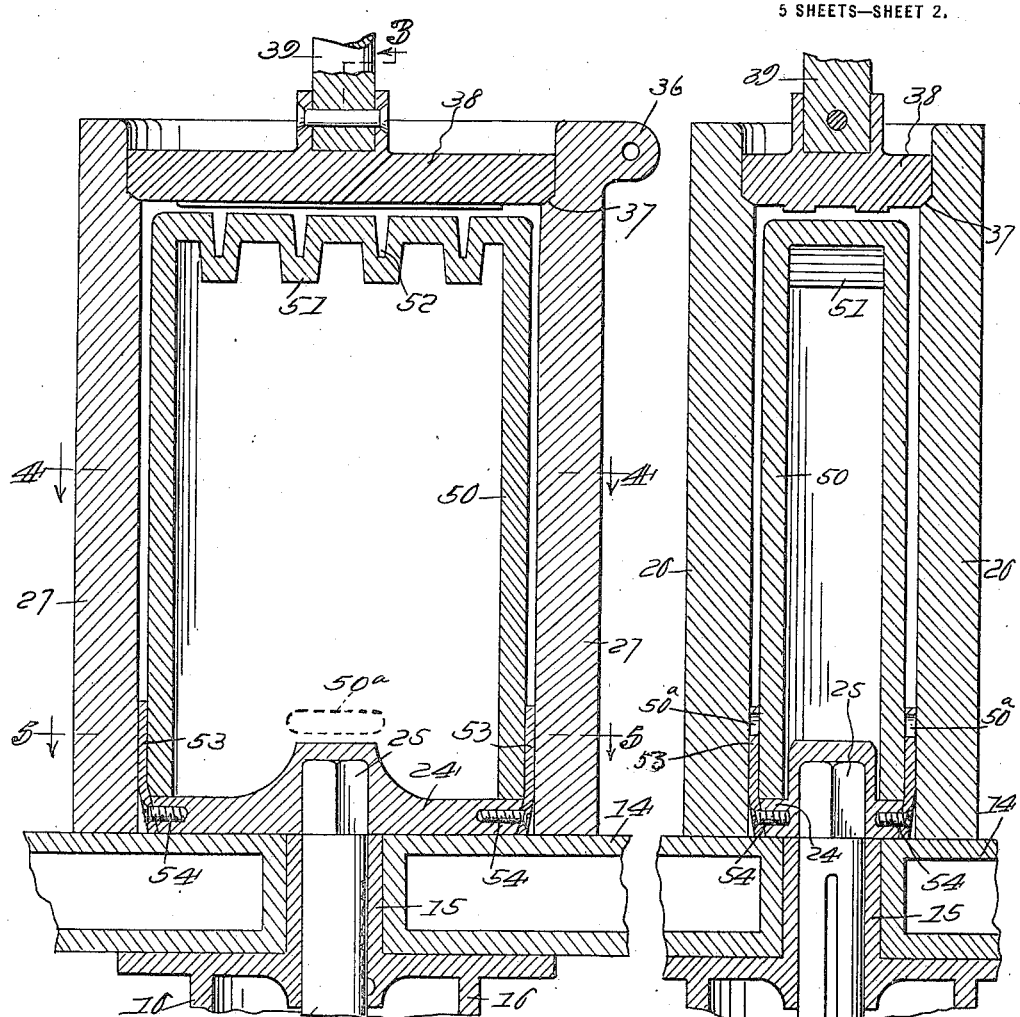
Fig. 2 is a vertical sectional view of the mold and allied parts.
Fig. 3 is a vertical section on the line 3—3 of Fig. 2.
Figure 9:
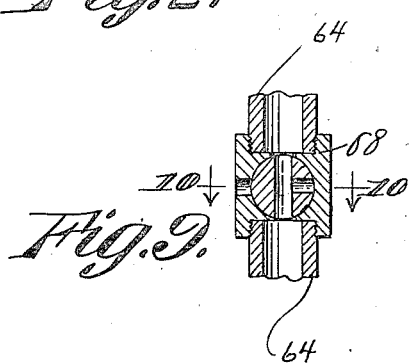
Fig. 9 is a sectional view of one of the valves for controlling the passage of air.
Figure 10:
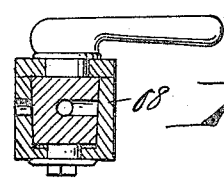
Fig. 10 is a section on the line 10—10 of Fig. 9.

One of the members 27 is provided at its end adjacent the handle 33 with outwardly projecting pairs of perforated lugs 36. All four of the sections 26 and 27 are rabbetted at their upper ends to provide a beveled shoulder 37, as illustrated in Fig. 2, upon which beveled shoulder the plunger 38 rests when the plunger is down, this beveled shoulder limiting the descent of the plunger. The plunger 38 is pinned or otherwise attached to a plunger rod 39. Disposed upon brackets 40 extending from the standards of the machine is a plate 41, the central portion of which is perforated for the passage of the plunger 39, and attached to this plate by bolts 42 is a cylinder head 43, the central portion of which is formed with a hub 44 through which the connecting rod passes and to which the connecting rod or plunger rod 39 is splined. Carried upon the head 43 is a cylinder 45, the upper end of which is closed by a head 46 likewise attached to an upper plate 47 forming part of the frame and preferably formed integral with the standards. Carried upon the piston rod is a piston 48 moving within the cylinder, and between the lower head of the cylinder and this piston rod is a compression spring 49. The pistons 48 and 21 may be made in any suitable manner and require no special description.

Mounted upon the plunger 24 is a mandrel 50 which has the shape of the interior of the battery jar and which is formed at its upper end with the depressed portions 51 providing recesses 52 extending transversely across the mandrel from side to side, and designed to form the transversely extending lugs in the completed jar. This mandrel is supported upon the plunger head 24 by means of four metallic strips 53, these strips, as illustrated in Fig. 5, being attached to all four sides of the rectangular plunger head 24 by means of screws 54. The end strips overlap the longitudinally extending strips. Thus these strips form a rectangular cup within which the rectangular mandrel is supported, these strips being somewhat resilient and clamping the mandrel firmly in place. The strips have a thickness exactly equal to the distance between the mandrel and the wall of the mold, thus spacing the mandrel from the wall of the mold, and being designed to receive the softened rubber when the battery jar is being formed. These strips also limit the downward movement of the material forming the battery jar and, therefore, define what is to be the upper edge of the battery jar. These strips perform other functions which will be described in describing the operation of the mechanism.

Pivoted between the lugs 36 is an arm 55 which projects below the pivot bolt 56, as at 57, so as to normally rest against the side wall of the mold and be supported in a horizontal position. This arm is provided with a handle 58 and on its extremity carries a collar 59 supporting a die 60, which may be formed to carry removable types 61 in an obvious and well known manner. This die is for stamping or impressing into the side of the completed battery jar the number of the battery jar, manufacturer's name, or like data.

The pistons 48 and 21 are designed to be operated by means of compressed air or other fluid medium, and to this end we show a supply pipe 62 which is intended to be connected to a source of compressed air which extends down to a point somewhat above the mold and is then laterally extended and connected by a T 63 to branch pipes 64 and 65, the branch pipe 64 leading into the upper end of the cylinder 45, while the branch pipe 65 leads into the lower end of the cylinder 18. Each of these branch pipes adjacent the respective cylinder is provided with a cock 66 connected to a grease cup 67 or like means whereby lubricant may be caused to flow into the cylinders to lubricate the pistons therein. Passage through the branch pipe 64 is controlled by means of a valve 68 which is a two-way valve so constructed that when it is turned in one position passage through the corresponding branch pipe will be permitted so as to carry compressed air or other fluid medium from the supply pipe to the corresponding cylinder, and which, when turned in the other direction, will open a vent 69 permitting the exhaust of fluid pressure from the corresponding cylinder. These valves may be of any suitable and well known construction.

The operation of this mechanism is as follows:—Assuming that the mold is in place upon the hot plate and that the hot plate is suitably heated by steam or other heating medium, then air or other fluid under pressure is admitted beneath the piston 21 and this will cause the piston to move upward, carrying the plunger 24 to the top of the mold. At this time, of course, the plunger 38 which forms the cover of the mold is also raised to its full extent. The plunger 38, when raised, should be sufficiently high so that a mandrel 50 may be inserted between the plungers and disposed within the cup formed by the strips 53. It is to be noted at this point that the mandrel 50, as illustrated in Fig. 5, is rounded at the corners, while the cup is square at the corners, and this space (see Fig. 4) formed between the rounded corners of the mandrel and the square corners of the cup or holder, when the mandrel is in place, is designed to receive the surplus rubber which will be caused to flow thereinto by pressure.

The overflow spaces which receive the surplus rubber, being located as they are at the lower end of the mold, receive surplus rubber, as there is no opening at the top of the mold when the die or plunger 38 is in a compressing position, and it only escapes at the bottom corners where these overflow spaces are formed, as illustrated in Fig. 5. By placing these overflow spaces at the lower end of the mold, that is the end away from the plunger 38, the jar made by this machine is completely formed before any surplus rubber escapes, and this is a very important feature of the invention. When the mandrel with the formed jar is removed, the overflow will usually remain on the bottom corners of the mandrel. This may be cut off immediately or broken or ground off after the jar is vulcanized, and if the rubber by chance remains in the space between the members 53 and the rounded corners of the mandrel, it is easily removed by springing these members 53 open.

While the mandrel is being lowered, the mold sections are unlocked, and when the mandrel is lowered completely, then the mold sections are locked by operating the handle 33 in the manner heretofore described, and this locks the sections of the mold together. A piece of uncured rubber is then placed within the mouth of the mold, that is on top of the mandrel, and the valve 68 is then turned to its intake position to permit steam or compressed air to pass into the upper cylinder 45, causing the depression of the die or plunger 38. This will force the rubber, which has been rendered soft and semi-fluid by the heat of the heating plate, into the space between the mandrel and the mold and compresses this rubber so that every portion of this space is filled. After a suitable length of time the valve 68 is turned to exhaust the air or other fluid under pressure from the cylinder 45 and the die or plunger 38 will return to its fully raised position. The handle 33 is then turned to unlock the sections of the mold, which spread by reason of the spring 31, and thus free the mold sections from the rubber. The valve controlling the inlet of fluid to the cylinder 18 is then opened and the fluid operating against the piston 21 lifts the plunger 24 or mandrel support upward, carrying the cup formed of the strips 53 with the uncured rubber in the shaped battery jar upward out of the mold. When the battery jar has been lifted out of the mold and before it is removed from the cup, the handle 58 is used to operate the arm 55 and impress in the soft rubber the types or other dies 61. The mandrel with the formed jar on its outside is now taken out of the cup and the jar with the mandrel still inside it is sent to be cured. Then the overflow of rubber is taken out of the corners of the cup formed of the strips 53 and the machine is ready to make the next jar.

It is to be particularly noted that the strips 53 are drawn inward at their lower ends so that the upper edges of the strips are urged outward against the inside face of the mold, and thus when the plunger 24 is lifted, these strips act to clean and scrape the interior face of the mold, thus cleaning out any corrosion which may be left on the mold plates as the cup with the mandrel and completed battery jar are lifted out to the mouth of the mold.

In Fig. 7 we illustrate the completed battery jar A. It will be noted that the completed jar has lugs B extending across its bottom, and these lugs are of even height, and that there is a reinforcing thickness C at the bottom of the jar. This thickness may be in the form of a strip applied to the bottom of the jar, or it may be a mere thickened portion at the bottom of the jar, but in either case this reinforcement is formed in our machine when the battery jar is formed, whereas in making ordinary battery jars this reinforcing strip or thickness must be put on by hand. Further, it will be seen that the lugs B are formed in the jar at the time that it is molded and thereby eliminate the defects due to hand work and irregularities thereof. This machine will eliminate over 60% of the labor costs, and it forms hard rubber jars in one operation, whereas other methods known to us require from 7 to 8 operations.

Again, by this machine a battery jar is formed in which seams and joints are entirely eliminated. These seams and joints, which are inevitable in hand made jars, cause over 10% of defective workmanship. Again, because of defects due to hand labor, it is necessary that with the ordinary jar it should be ground in order that the jars may have the exact dimensions required. 75% of this grinding is eliminated by this mechanism. The use of this mechanism eliminates the necessity of calendering the plastic rubber to an exact thickness so as to form sheets which may be made into better jars. The rubber comes in square blocks and the necessity of calendering the rubber so as to form it into sheets having a certain predetermined thickness causes the rejection of a very large amount of rubber because it is of the wrong thickness or because it is wrinkled. The amount rejected approximates 15% of what is daily used. Furthermore, by the use of our mechanism, we eliminate the use of large rolls, called linings, which are very expensive.

Attention is called to the fact that in order to prevent the mold from shifting upon the heating plate and hold the mold centered on the heating plate and with relation to the core, we extend the pintle 29 down into the heating plate and at the opposite corner, that is diagonally opposite to the pintle 29, we provide a pin 70 and recess the plate 26 at 71 and the plate 27 at 72 to embrace this centering pin 70 so as to hold the mold in its centered position on the heating plate when the mold is closed and embrace the core.

In Figs. 11 and 12 we show a modification of the means for supporting the mandrel within the mold chamber, in which pivoted mandrel clamping strips are mounted upon the mandrel support 24 in place of the resilient strips 53 heretofore described. In these figures, 27 designates, as before, the mold, which is open at its upper end, but is larger in diameter than the mold heretofore referred to, and rests upon the heating plate 14 in the manner heretofore described. Normally disposed at the lower end of the mold is the mandrel support $24^a$, and pivoted to this mandrel support are four plates 74. Each of these plates 74 is thickened at its lower end to provide a shoulder 75, and each plate is pivoted upon a pintle 76. The upper end of each plate is laterally deflected, as at 77, to rest upon the inclined shoulder $37^a$ at the upper portion of the mold, and then each plate extends upward to the top of the mold and is formed with an outwardly extending flange 78. The thickness of each plate 74 below the shoulder 75 is equal to the distance between the mold wall 27 and the mandrel, but above this shoulder each plate is relatively thinner so as to provide a space between the mandrel and the inner face of the plate for the rubber. This construction operates precisely similar to the one heretofore described, except that when the mandrel is lifted by the upward movement of the mandrel support 24ª, these mandrel engaging members will open out, as illustrated in Fig. 11, and thus permit the removal of the mandrel and the formed battery jar. It will, therefore, be seen that the mandrel cup or holder formed by the four plates does not differ in principle from the mandrel cup or holder illustrated in Figs. 1 to 10. The second form of cup or holder, however, automatically disengages from the mandrel when the mandrel and the completed cup are lifted above the mold.

It will be understood, of course, that the rubber composition which is used in this machine comes in square blocks, and that the blocks will have the same cubic area that will be required to form the complete jar. This rubber block is placed at the mouth of the mold and flows about the mandrel and the die or mold closure compresses the rubber as the rubber is heated and rendered fluent. The mandrel may be formed with an opening or slot 50ª in one of its walls which is below the upper edge of the strips 53, and therefore, closed by these strips when the mandrel is in place within the mold.

It will be seen that this machine is designed to mold battery jars before they are vulcanized and that with this machine only a certain definite amount of rubber is placed at the mouth of the mold and this rubber under heat and under pressure from only one plunger 38 causes the rubber to flow in all directions down the sides of the mandrel and into the lug grooves, the plunger being of course, stopped in its inward movement by the shoulders 37 at a sufficient distance from the portion 51 of the mandrel to form the bottom of the battery jar. In our construction no hand wrapping methods are used, that is no sheets of rubber are wrapped around a core or mandrel or otherwise placed in position against the sides and bottom of a mandrel. Therefore, our machine saves the time required in this wrapping operation or in the placing of sheets of rubber in position around the mandrel. Furthermore, where sheets of rubber are used, either wrapped around a mandrel or placed against the sides of the same it is necessary that the sheets of rubber should be calendered, that is the plastic rubber must be rolled to an exact thickness before being used. Our machine forms a jar complete from a solid piece of rubber compound placed in the upper portion of the mold which the heat renders fluent, this fluent rubber compound being forced into the space between the mandrel and the mold by the plunger 38. Our machine does away with the necessity of cutting the plastic rubber to a certain size and only requires that a piece of rubber be cut of sufficient size to fit over the top of the mandrel between the mandrel and the plunger. Uncured rubber of any desired shape or condition is used and only one plunger is used to compress and cause the rubber to flow about the mandrel.

We claim:—

1. A mechanism for molding battery jars including a mold having an exterior form of the battery jar, means for heating the mold, and a mandrel disposed within the mold and having a shape exteriorly of the interior of the battery jar, and means at one end of the mold for forcing fluent material through the space between the mandrel and the mold, the opposite end of the mold having overflow spaces leading from the end of the space within which the jar is formed.

2. A mechanism for molding battery jars comprising a heating plate, a mold carried upon the heating plate and heated thereby, a mandrel or core normally disposed within the mold, a plunger forming the top of the mold and adapted to be forced downward to force the material of the jar into the space between the mandrel and the mold, and means for lifting the completed jar and the mandrel out of the mold.

3. A mechanism for molding battery jars including a mold, means for heating the mold, a mandrel support disposed within the mold, a plunger forming the top of the mold, and means for shifting the plunger into the mold or removing it therefrom, and means for shifting the mandrel support out of or into the mold.

4. A mechanism for forming battery jars including a mold formed in sections, means whereby the sections may be closed or opened, means for heating the mold, a mandrel support disposed within the mold, a plunger forming a closure for the mold, and means for shifting the plunger into or out of the mold, and means for shifting the mandrel support from a position at one end of the mold to a position at the other end of the mold.

5. A mechanism for forming battery jars comprising a sectional mold, means whereby the sections of the mold may be clamped together or released and spread apart, a mandrel support disposed within the mold and movable longitudinally therethrough and having marginal walls forming a cup to engage the mandrel, said marginal walls bearing against the inner face of the mold and the outer face of a mandrel, a plunger forming a closure for the mold, and means for reciprocating the plunger into or out of the mouth of the mold, and means for reciprocating the mandrel support.

6. A mechanism for forming battery jars comprising a heating plate, a central mold carried by the heating plate, the sections of the mold being hinged to each other whereby the mold may be opened up or closed, means for urging the mold sections apart, means for clamping the mold sections together, a rod passing through the heating plate and into the mold, a mandrel support disposed within the mold and mounted upon said rod and having means to engage the mandrel therewith, a plunger forming a closure for the mouth of the mold and movable into said mouth, and means for reciprocating said last named plunger and for reciprocating the rod supporting the mandrel support.

7. A mechanism for molding battery jars comprising a heating plate, a sectional mold mounted thereon, resilient means urging the sections apart from each other, means for clamping the sections in engagement with each other, a piston rod passing through the heating plate, a mandrel support disposed within the mold and connected to said rod, a piston on the rod, a cylinder in which the piston operates, a plunger constituting a closure for the mold and disposed at the opposite end of the mold and movable thereinto, a piston to which the plunger is connected, a cylinder in which the piston operates, means urging said pistons away from each other, and means for admitting fluid pressure to either one of said cylinders to cause the inward movement of the pistons therein and for relieving pressure within either one of the cylinders to thereby permit the outward movement of the pistons.

8. A mechanism for molding battery jars including a mold formed of sections hinged to each other, a spring urging said sections apart, a manually operable clamp for urging the sections together, a mandrel support disposed within the mold and longitudinally shiftable therethrough and having on each margin a resilient metallic strip bearing against the inner surface of the mold and adapted to bear against a mandrel disposed within said strips and resting on said support, and a closure movable into or out of the mouth of the mold, and means for shifting the plunger into or out of the mold and for shifting the mandrel support toward or from the mouth of the mold.

9. A mechanism for forming battery jars including a sectional mold, means urging said sections apart to open the mold, means for clamping said sections together to close the mold, a mandrel support normally disposed in one end of the mold and having resilient clamping strips at its margins, a mandrel less in cross sectional area than the cross sectional area of the mold and having one end engaged by said strips, the strips connecting the space between the mandrel and the mold bearing against the inner face of the mold, and a plunger constituting a closure for one end of the mold and shiftable into or out of the mold, and means for shifting the plunger into or out of the mold and for shifting the mandrel support from the mouth of the mold to the opposite end thereof, or vice versa.

10. A mechanism for forming battery jars including a supporting frame, a heating plate carried by said frame, a sectional mold mounted upon the heating plate, means resiliently urging said sections apart to open the mold, means for clamping said sections together, a mandrel support disposed within the mold and normally resting upon the heating plate, a cylinder disposed below the heating plate, a piston operating in the cylinder and having its piston rod connected to the mandrel support, a mandrel normally mounted upon said support and movable therewith into or out of the mold, a plunger constituting a closure for the mouth of the mold and movable into or out of the mouth of the mold, the mold having shoulders against which the plunger bears to limit the inward movement of the plunger, a cylinder supported upon said frame above the mold, a piston operating therein and having a piston rod connected to the plunger, and means for admitting fluid pressure into said cylinders to shift the pistons therein and shift the plunger and mandrel support.

11. A mechanism for forming battery jars including a supporting frame, a heating plate carried by said frame, a sectional mold mounted upon the heating plate, means resiliently urging said sections apart to open the mold, means for clamping said sections together, a mandrel support disposed within the mold and normally resting upon the heating plate, a cylinder disposed below the heating plate, a piston operating in the cylinder and having its piston rod connected to the mandrel support, a mandrel normally mounted upon said support and movable therewith into or out of the mold, a plunger constituting a closure for the mouth of the mold and movable into or out of the mouth of the mold, the mold having shoulders against which the plunger bears to limit the inward movement of the plunger, a cylinder supported upon said frame above the mold, a piston operating therein and having a piston rod connected to the plunger, and means for admitting fluid pressure into said cylinders to shift the pistons therein and shift the plunger and mandrel support, said mandrel at its end toward the plunger being formed with transversely extending, spaced recesses whereby to form transverse lugs on the battery jar.

12. A mechanism for molding battery jars including a rectangular mold formed in sections, means urging said sections away from each other, means for forcing said sections toward each other, means for heating the mold, a mandrel support disposed within the mold and normally resting on the heating plate and rectangular in plan, resilient metallic strips attached to the edges of said mandrel support and extending into the mold and bearing against the inner faces of the mold, said strips intersecting each other at right angles, a mandrel disposed upon said mandrel support and engaged by said strips, said mandrel having rounded corners opposed to the right angular corners of the strips, a plunger movable into or out of the mouth of the mold, and means for shifting said plunger into or out of the mold and for shifting the mandrel support toward and from the mouth of the mold.

13. A mechanism of the character described including supporting standards, a hollow plate mounted upon said standards and adapted to be filled with a heating element, a plate mounted upon the standard below the heating plate, a cylinder connected at one end to the second named plate and at its upper end to the heating plate, a piston operating in the cylinder and having a piston rod passing through the heating plate, a rectangular mold formed of sections, the sections being pivoted to each other at one corner of the mold, said mold resting upon the heating plate, a spring disposed to open the mold at the opposite corner from the hinge, a clamp adapted to close the mold at the last named point, a rectangular mandrel support mounted upon said piston rod and normally resting on the heating plate, resilient strips attached to the edges of said support and bearing against the inner faces of the mold, a mandrel having one end closed and the other end open and having its open end disposed within and engaged by said strips and resting upon the mandrel support, the mandrel being spaced from the inner faces of the mold by said strips, a plate mounted upon the supporting frame above the mold, a cylinder supported upon said plate, a piston operating in the cylinder and having a piston rod extending through the plate and toward the mold, a plunger carried by said piston rod and constituting a closure for the mold, the mold having shoulders at its mouth against which said plunger is adapted to rest, springs urging said pistons outward, and independent means for admitting fluid under pressure into said cylinders behing the pistons to force the pistons toward each other against the action of said spring.

14. A mechanism for forming articles of the character described comprising a mold, means for elevating the articles after they are formed into a position above the mold, and an impressing stamp mounted upon the mold and adapted to be shifted to bring the stamp against the side wall of the article to thereby mark it.

15. A mechanism of the character as stated in claim 2, further characterized by having an arm pivotally mounted upon the side wall of the mold, an impressing die adjustably carried upon said arm and adapted, when the arm is raised, to engage the exterior face of a molded jar.

16. In molding mechanism, a supporting plate and a mold formed of two sections, the sections being pivoted to each other and upon the plate to permit the sections to be moved toward and from each other, the free ends of the sections being complementarily recessed upon their confronting faces a centering pin disposed in said plate with which said recesses coact when the mold is closed, and means for opening and closing the mold and locking it in a closed position.

17. A mechanism for forming battery jars including a sectional mold, a mandrel support normally disposed in one end of the mold, clamping strips carried at the margins of the mandrel support and extending up above the same, a mandrel less in cross sectional area than the cross sectional area of the mold and to be engaged by said strips, the strips filling the space between the mandrel and the mold and bearing against the inner face of the mold, and a plunger constituting a closure for one end of the mold and shiftable into or out of the mold, and means for shifting the mandrel support from the mouth of the mold to the opposite end thereof, or vice versa.

18. A mechanism for forming battery jars including a mold, a mandrel support normally disposed in one end of the mold and movable longitudinally therethrough, and mandrel holding means carried by said mandrel support.

19. A mechanism for forming battery jars including a mold, a mandrel support normally disposed in one end of the mold and having resilient mandrel clamping strips extending upward from its margins.

20. A mechanism for forming battery jars including a mold, a mandrel support normally disposed in one end of the mold and having mandrel strips pivoted to its margins, the lower ends of said strips having a thickness equal to the distance between the mold, and a mandrel carried by said mandrel support, the upper portions of the strips having a less thickness than the lower portions, and means for reciprocating the mandrel support longitudinally through the mold.

21. A mechanism for forming battery jars including a mold having side walls and closed at one end but open at the other end, a mandrel disposed within the mold and having one end below the level of the open end of the mold to receive rubber between the mandrel and the top of the open end of the mold, means for heating the mold and the rubber therein to render the same fluent, and a plunger adapted to close the open end of the mold and force the fluent rubber into the space between the mold and the mandrel.

22. A method of forming battery jars consisting in disposing a mandrel within a mold, disposing rubber composition in the mold, heating the mold to render the rubber composition fluent and forcing in one wall of the mold to force the fluent rubber into the space between the mandrel and the mold.

23. A mechanism for forming battery jars including a mold having side walls, the mold being closed at one end but open at the other end, a mandrel disposed within the mold and having one end below the open end of the mold to receive rubber between the mandrel and the top of the open end of the mold, said mandrel having rounded corners, means on the closed end of the mold for embracing the mandrel, said means comprising members extending at right angles to each other whereby an overflow space is left between the corners formed by the adjacent ends of said members and the rounded corners of the mandrel, and means for heating the mold and the rubber therein, and means for closing the open end of the mold and forcing the fluent rubber into the space between the mold and the mandrel.

In testimony whereof we hereunto affix our signatures.

JOHN H. TEN BRINK.
ALVIN V. MARTIN.